(12) United States Patent
Paczewitz

(10) Patent No.: US 6,574,002 B1
(45) Date of Patent: Jun. 3, 2003

(54) SELECTION OF PRINTING FEATURES AT PRINT TIME

(75) Inventor: Laura M. Paczewitz, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 776 days.

(21) Appl. No.: 08/959,138

(22) Filed: Oct. 28, 1997

(51) Int. Cl.⁷ .............................................. G06F 15/00
(52) U.S. Cl. ...................................... 358/1.13; 358/1.1
(58) Field of Search ................................ 395/101, 112, 395/114; 345/347, 975, 326, 339, 354

(56) References Cited

U.S. PATENT DOCUMENTS

| | | | | |
|---|---|---|---|---|
| 4,666,801 A | * | 5/1987 | Kimura et al. ................ 430/33 |
| 5,369,419 A | * | 11/1994 | Stephenson et al. .......... 347/61 |
| 5,572,632 A | * | 11/1996 | Laumeyer et al. .......... 395/116 |
| 5,828,461 A | * | 10/1998 | Kubo et al. ................. 358/296 |
| 5,839,117 A | * | 11/1998 | Cameron et al. ............. 705/27 |
| 5,862,322 A | * | 1/1999 | Anglin et al. ............ 395/185.1 |

* cited by examiner

Primary Examiner—Gabriel Garcia

(57) ABSTRACT

A method allows selection of printing features at print time. Upon a user selecting to perform a first print job from an application, a print dialog box is displayed. Upon the user closing the print dialog box without canceling the first print job, a media-type pop-up dialog box is displayed. The media-type pop-up dialog box allows a user to specify which type of media is to be used for printing the first print job. Upon the user changing selection of media-type, print parameters for the first print job are changed. Upon the user closing the media-type pop-up dialog box without canceling the first print job, the first print job is printed.

18 Claims, 10 Drawing Sheets

SELECTION OF PRINTING FEATURES AT PRINT TIME

BACKGROUND

The present invention concerns the control of printers within a computing system and pertains particularly to the selection of printing features at print time.

Typically, a printer driver includes a "set-up" page to allow a user to specify various parameters for printing. For example, a typical "set-up" page allows a user to specify paper size, paper orientation, reduction/enlargement, and various other printer parameters depending upon the features of the particular printer.

When a user elects to print a job, often a printer dialog box appears. The printer dialog box allows a user to specify such things as the number of copies to be printed, the print destination and the paper source.

For certain types of printers, such as ink jet printers used to print on a variety of print media, it is important for software and printer firmware to know the correct print media type. This is because for optimum printing is may be necessary to vary printing parameters, such as color maps, print modes and dry times, for different print media types. Generally, a user has been able to select the paper type only via a "set-up" page. The "set-up" page is often accessible by selecting a "set-up page" or "properties" button within the printer dialog box.

The implementation of "pop-up" message box has been used to indicate to a user how to change settings like paper type in the future. However, such "pop-up" message boxes have not provided a way to change media type for the current print job without canceling the print job and accessing the "set-up" page.

SUMMARY OF THE INVENTION

In accordance with the preferred embodiment of the present invention, a method is presented for selecting printing features at print time. Upon a user selecting to perform a first print job from an application, a print dialog box is displayed. Upon the user closing the print dialog box without canceling the first print job, a media-type pop-up dialog box is displayed. The media-type pop-up dialog box allows a user to specify which type of media is to be used for printing the first print job. Upon the user changing selection of media-type, print parameters for the first print job are changed. Upon the user closing the media-type pop-up dialog box without canceling the first print job, the first print job is printed.

In the preferred embodiment, the media-type pop-up dialog box also allows a user to specify, for a first subset of media types, which side of the media will be used for printing the first print job. Upon the user changing selection of side to be printed, print parameters for the first print job are changed. This is particularly useful when, for example, photo paper with a glossy side and a matte side is used.

For media-types which are not among the first subset of media types (i.e., they do not require print parameters to be varied based on which side is printed) the user is prevented from specifying which side of the media will be used for printing the first print job.

Also in the preferred embodiment, the user can make a first selection, which results in the media-type pop-up dialog box not being displayed for future print jobs. However for future print jobs, e.g., a second print job, upon the user closing the print dialog box without canceling the second print job, a paper side dialog box is displayed if a media-type for the second print job is among the first subset of media types (e.g., for photo paper with a glossy side). The paper side dialog box allows a user to specify which side of the media will be used for printing the second print job. Upon the user changing selection of the side to be printed, print parameters for the second print job are changed. Upon the user closing the paper side dialog box without canceling the second print job, the second print job is printed. If the media-type for the second print job is not among the first subset of media types, the paper side dialog box is not displayed before printing the second job.

The present invention allows a user to change the paper type without utilizing a set-up page or a properties user interface. Such a set-up page or properties user interface can be hard to find within some applications. Further, the present invention allows a user at the time of printing to select the paper type rather than merely being reminded to make a selection for the next print job. Further, by bringing up a separate media-type pop-up dialog box the user is forced to consider which paper type is being used, rather than relying on a default paper type. This is especially helpful for a printer which supports a wide variety of papers and provides for a user to receive the best output specifically engineered for each paper type.

DESCRIPTION OF THE PREFERRED EMBODIMENT

Figure 1:
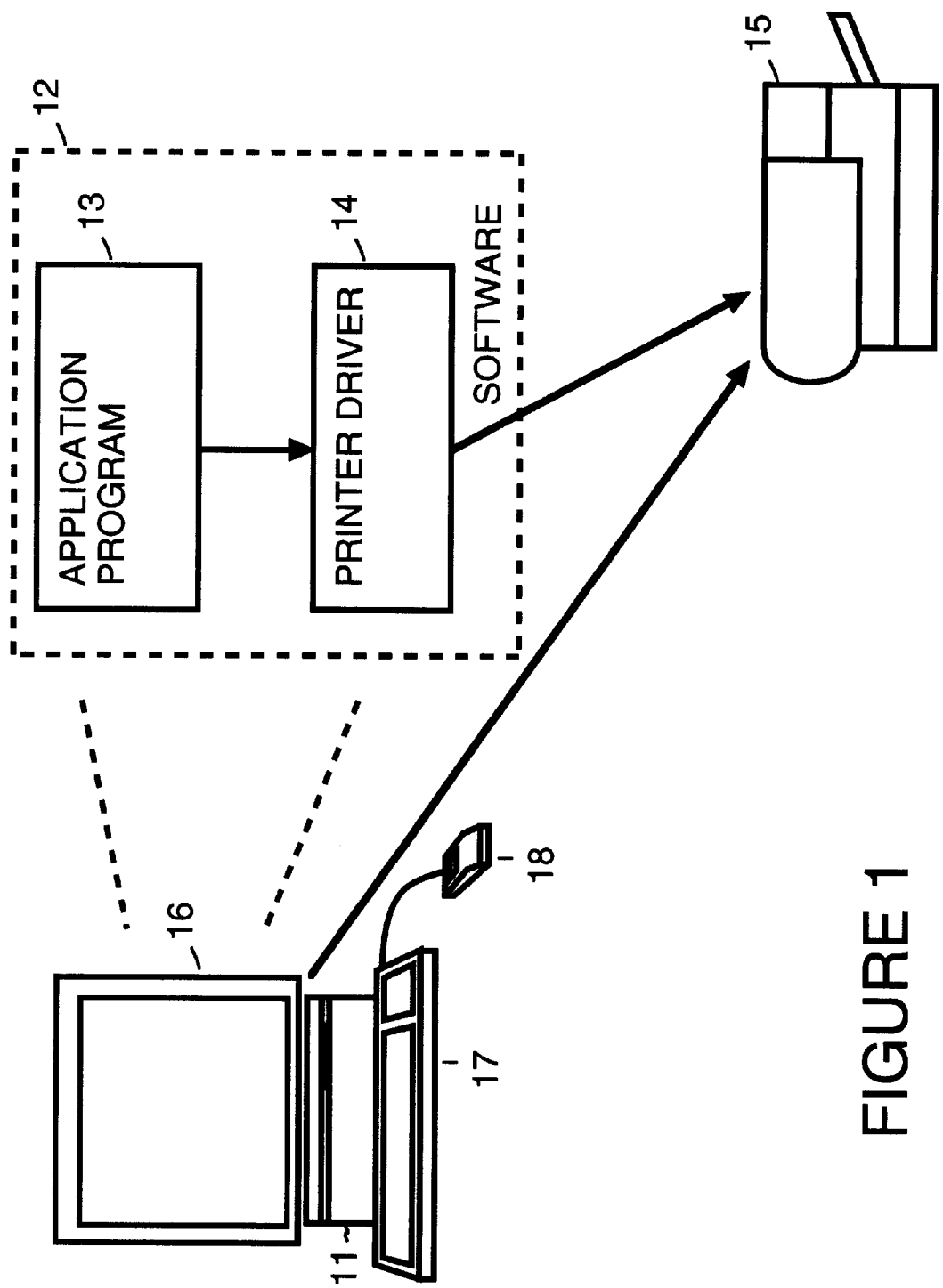
FIG. 1 is simplified block diagram showing connection of a printer to a computing system.

FIG. 1 is a simplified block diagram which shows connection of a printer 15 to a computing system 15. For example, printer 15 is an ink jet printer which is used for printing photographs. Computing system 15 is, for example, a computing system capable of operating under the Windows operating system software available from Microsoft Corporation, having a business address at 16011 NE 36th Way, Redmond, Wash. 98073-9717, or of operating under another operating system such as the UNIX operating system or Macintosh operating system. Computing system 15 includes a monitor 16, a keyboard 17 and an input pointing device 18 which is, for example, a mouse.

Software 12 represents software which runs on computing system 11. When a user desires to print using printer 15, a current application program, such as application program 13, utilizes a print driver 14 for printer 15 in order to perform the print job.

In order to configure print driver 14, a user can use a properties user interface implemented by print driver 14. The properties user interface (also referred to herein as a "set-up" page) provides a way for the user to specify which print media type (e.g., which type of paper) is to be used for a print job. In addition, for various types of paper, printing parameters may vary depending upon whether the front side or the reverse side is used for printing. For these types of paper, it is also possible for a user to indicate whether the front side or the back side for printing.

Figure 10:
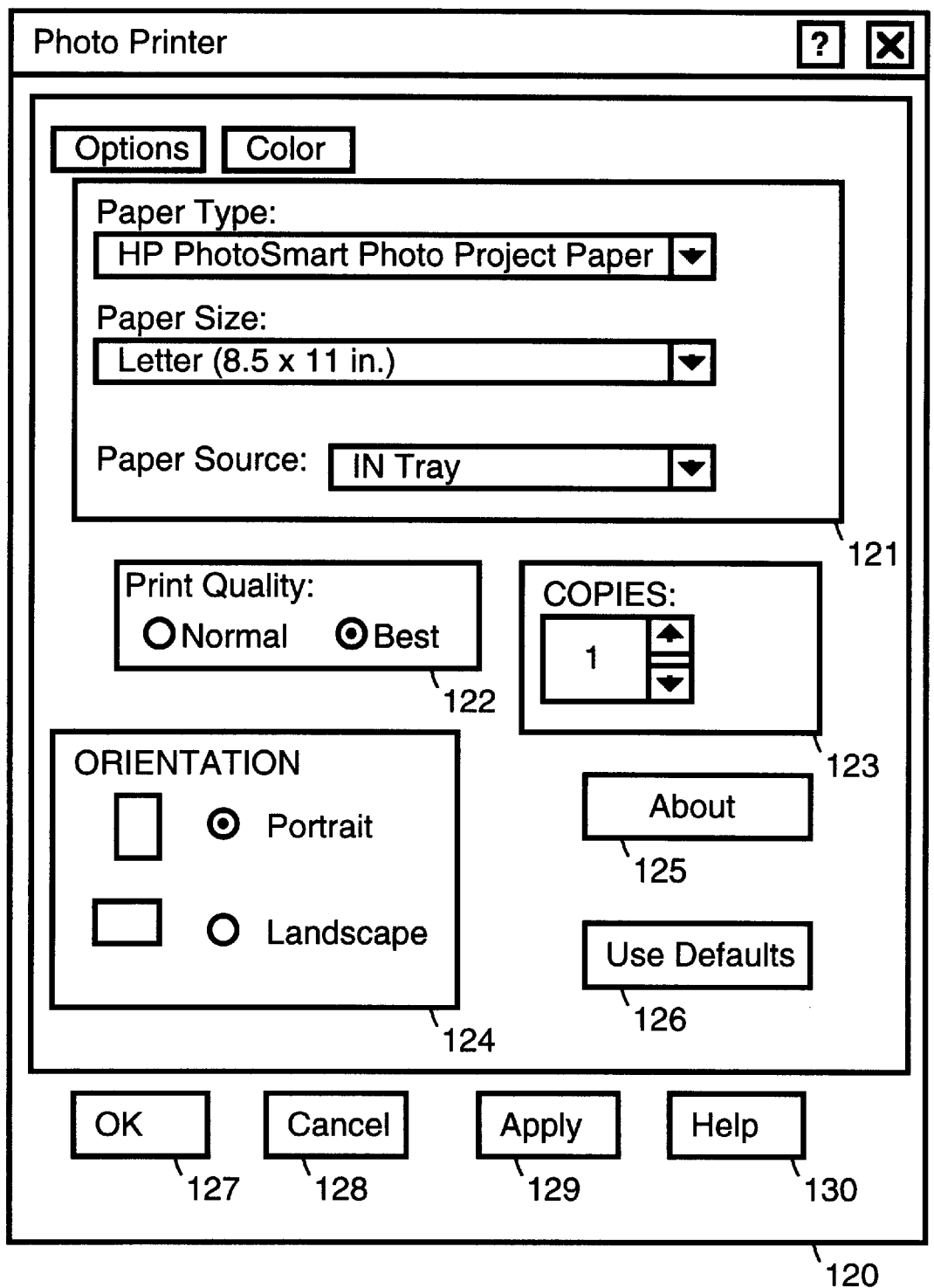
FIG. 10 is an example of a properties user interface ("print set-up" dialog box) for printing.

FIG. 10 shows an example of a properties user interface (i.e., print set-up window) 120. Using a Paper Options section, a user can select paper type, paper size and paper source. Using a print quality box 122, a user can select print quality. Using a copies box 123, a user can select a number of copies. Using an orientation box 124, a user can select print orientation. The user can receiving additional information about the print driver by selecting an "About" button 125. The user can choose default settings for the printer by selecting a "Use Defaults" button 126. The user can close the properties user interface 120 with any changes being applied by selecting an OK button 127. The user can close the properties user interface 120 without any changes being applied by selecting a Cancel button 128. The user immediately apply any changes without closing the properties user interface 120 by selecting an Apply button 129. The user can request assistance by selecting a help button 130.

When performing a print job, the user also is provided an opportunity to select parameters for a print job. This is done, for example, using a print dialog box which computer system 11 displays on monitor 16 when the user prints from within an application.

Figure 2:
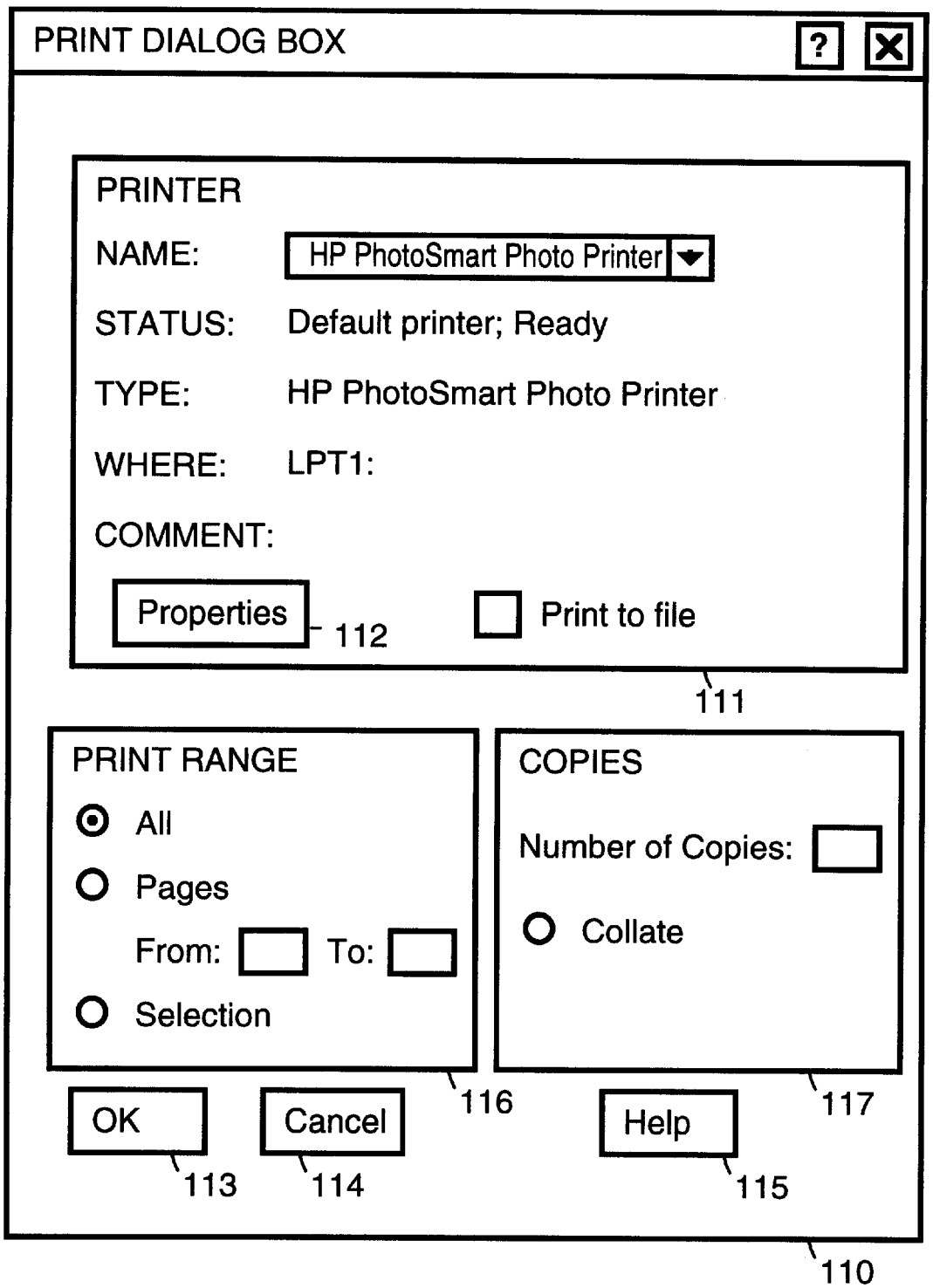
FIG. 2 is a view of a dialog box for printing in accordance with the preferred embodiment of the present invention.

This is illustrated by a print dialog box 110, shown in FIG. 2. Interacting with a region 111, a user can select a printer. Various status information is also displayed within region 111 for selected printer. Using a print range box 116, a user can select a range of pages to be printed. Using a copies box 117, a user can select a number of copies to be printed. Additionally, the user can access properties user interface 120 by selecting a properties button 112. The user can proceed with the print by selecting an OK button 113. The user can cancel by selecting a cancel button 114. The user can request assistance by selecting a help button 115.

Figure 3:
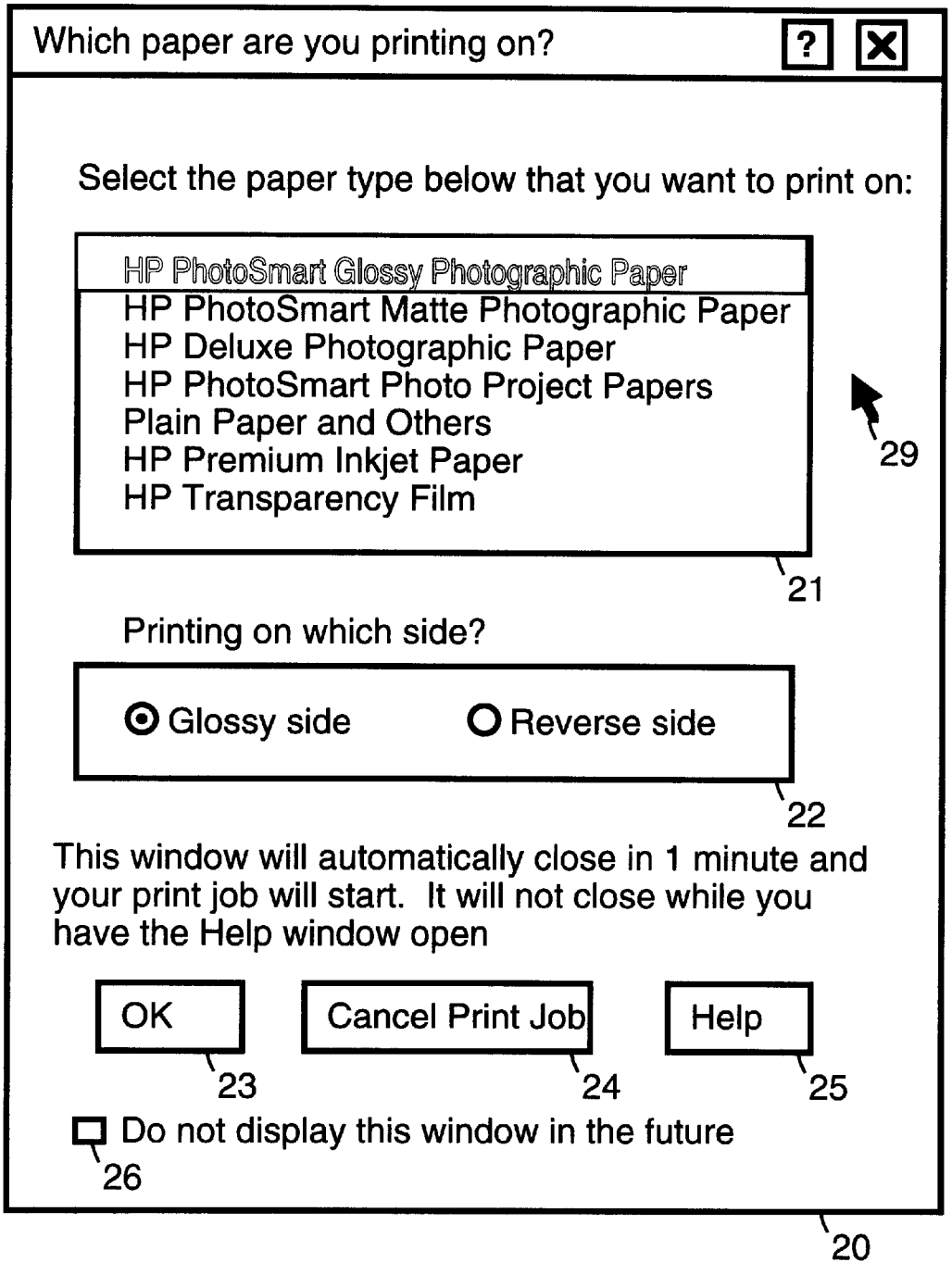
FIG. 3 is a media-type pop-up dialog box which provides for selection of print media and print side for a print job in accordance with the preferred embodiment of the present invention.

In the preferred embodiment, when the user selects OK button 115, computer 11 displays a paper type pop-up dialog box 20 on monitor 16, as shown in FIG. 3. This will occur unless dialog box 20 has been disabled. Dialog box 20 includes the caption "Which paper are you printing on?".

Using a cursor 29, controlled by mouse 18 (or another pointing device) the user selects the paper type from those listed in a paper type combination box 21. The default media which is selected when dialog box 20 first appears is the media type which the user selected in the properties user interface. If the user has not selected a media type in the properties user interface, the default media which is selected when dialog box 20 first appears is the media type which the user last selected when printing from the current application. Otherwise the paper type is chosen from the value stored in the DevMode object, which stores the current settings for application program 13. DevMode is a structure available within the Windows operating system software available from Microsoft Corporation. The DevMode object stores user settings and is used by application program 13 and printer driver 14 to communicate and change the current settings. For example, Table 1 below sets out an example of the DevMode object:

TABLE 1

```
typedef struct_devicemode {    // dvmd
    TCHAR          dmDeviceName[CCHDEVICENAME];
    WORD           dmSpecVersion;
    WORD           dmDriverVersion;
    WORD           dmSize;
    WORD           dmDriverExtra;
    DWORD          dmFields;
    short          dmOrientation;
    short          dmPaperSize;
    short          dmPaperLength;
    short          dmPaperWidth;
    short          dmScale;
    short          dmCopies;
    short          dmDefaultSource;
    short          dmPrintQuality;
    short          dmColor;
    short          dmDuplex;
    short          dmYResolution;
    short          dmTTOption;
    short          dmCollate;
    TCHAR          dmFormName[CCHFORMNAME];
    WORD           dmUhusedPadding;
    USHORT         dmBitsPerPel;
    DWORD          dmPelsWidth;
    DWORD          dmPelsHeight;
    DWORD          dmDisplayFlags;
    DWORD          dmDisplayFrequency;
    WORD           dmICMMethod;
    WORD           dmICMIntent;
    WORD           dmMediaType;
    WORD           dmDitherType;
    DWORD          dmReserved1;
    DWORD          dmReserved2;
} DEVMODE:
```

In the preferred embodiment dmPrintQuality and dmMediaType are not used. In addition, appended onto the structure for printer driver 14 are the fields dmPaperType, and dmPaperSide as well as the internal table for media page settings. The DevMode object is saved by the operating system for driver 14 in the operating system registry. Some applications save the DevMode object between sessions, although not all applications behave the same.

For each paper type, there is a default print quality setting reflected in properties user interface 120 (shown in FIG. 10). The default print quality setting includes settings for print modes for each different paper (or other media) type. The print quality settings, "Normal" or "Best" includes internal print mode settings, such as number of drops put down and the number of passes the pen carriage makes over the paper. There is an initial default setting for each media type, kept internally in a table within computer system 11. From properties user interface 120 (shown in FIG. 10), called from within an application, the user can select a media type and change the print quality settings.

For each paper type there is also a color map, and three dry time settings (one for humid conditions, one for ambient conditions and one for dry conditions). The default is the ambient dry time, which is different for each paper type. The user can change dry time setting for all paper types in the toolbox by setting the conditions to dry, ambient or humid. The three dimensional table that stores the dry times for each paper type is kept internally.

If the user uses properties user interface 120 (shown in FIG. 10) to change the print quality setting for a particular media type, the selected print quality setting will then be used whenever application program 13 prints to that particular media type, unless changed later. The print quality setting also will be shown when that media type is chosen in properties user interface 120 (shown in FIG. 10). The selected media type will be the one shown as selected when the paper type reminder box is shown.

When certain media types are selected within paper type combination box 21, for example, HP PhotoSmart Glossy Photographic Paper or HP PhotoSmart Photo Project Paper, the user is given the option in field 22 to select a side of the paper on which to print. The default side which is selected when dialog box 20 first appears is the side which the user last selected when printing from the current application. An initial default side is glossy. Field 22 is grayed out for media types which are not designed for two-sided printing.

The user can proceed with the print by selecting an OK button 23. When user selects OK button 23, the current selection is saved in the DevMode object for application program 13. The user can cancel the print by selecting a cancel button 24. The user can request assistance by selecting a help button 25.

If the user does not interact with dialog box 20, dialog box 20 will automatically close in one minute and the print job will start, except, however, that dialog box 20 will not close while the Help window is open.

Using a box 26, the user can disable dialog box 20. That is, once box 26 is selected, dialog box 20 will not appear for subsequent print jobs. However, when and only when dialog box 20 is disabled, if a media type which is designed for two-sided printing, such as HP PhotoSmart Glossy Photographic Paper or HP PhotoSmart Photo Project Paper, is the currently selected media type, a paper side selection dialog box 30 (shown in FIG. 4) will appear before print driver 14 performs the print job.

Figure 4:
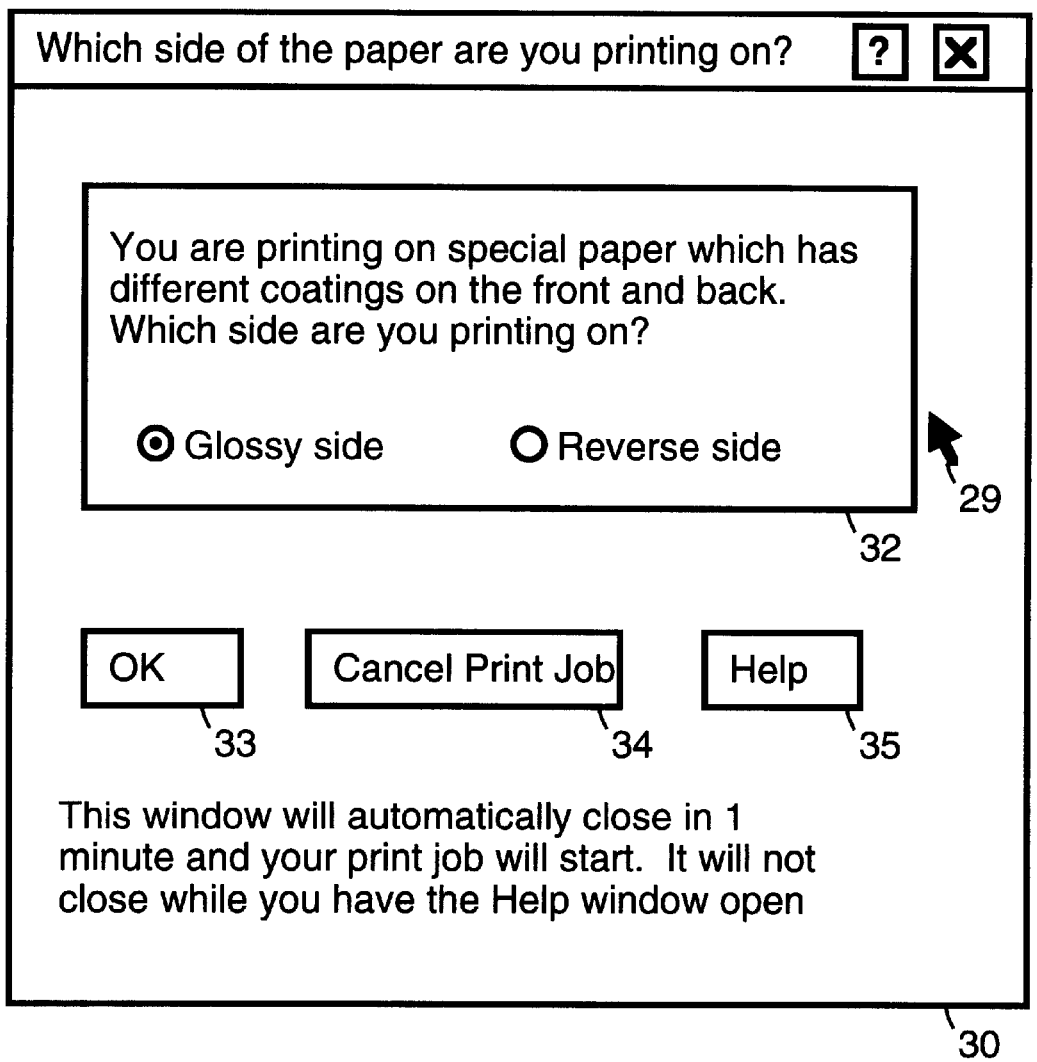
FIG. 4 is a paper side dialog box which provides for selection of print side for a print job in accordance with the preferred embodiment of the present invention.
Figure 5:
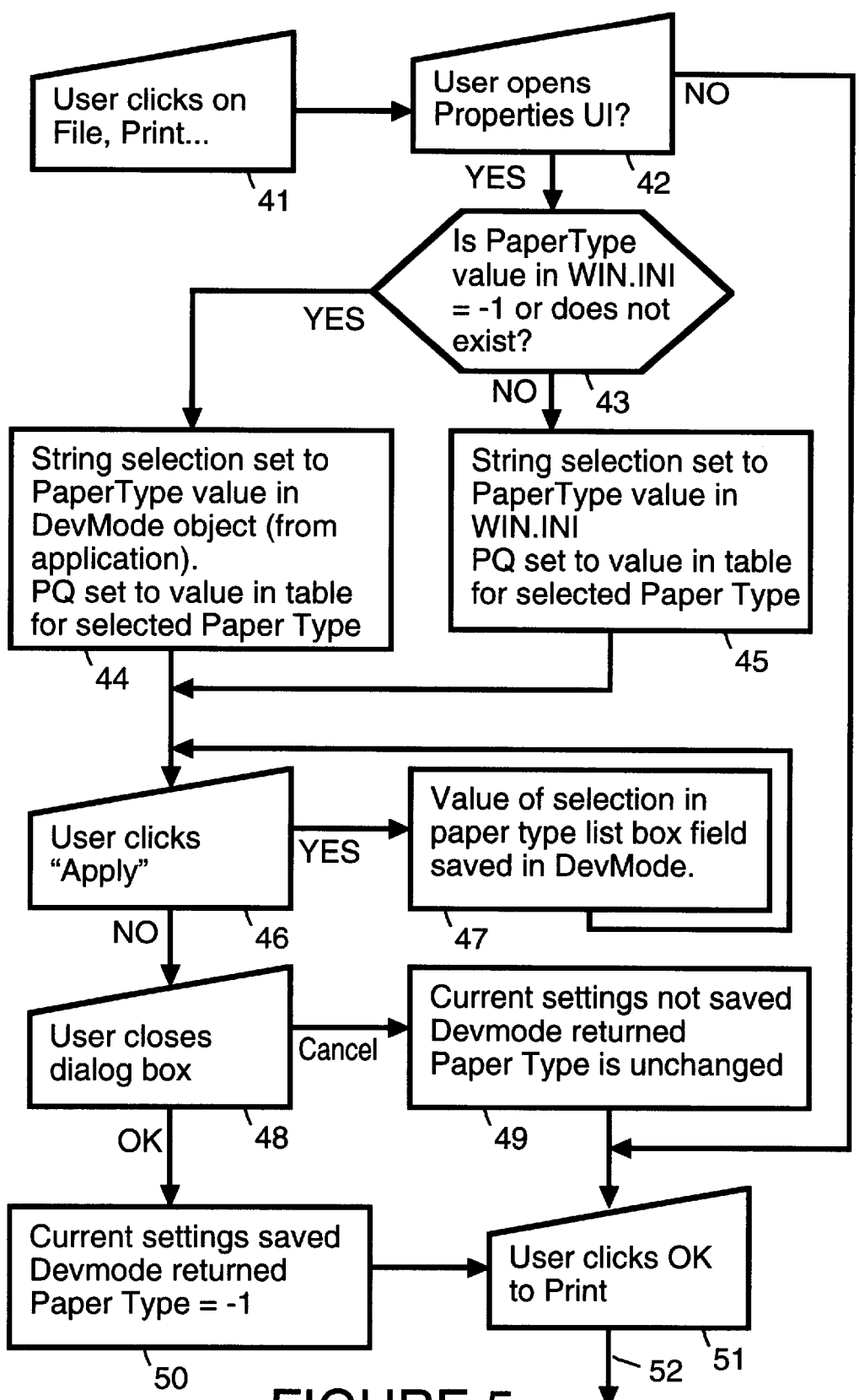
FIG. 5, FIG. 6, FIG. 7, FIG. 8 and FIG. 9 together form a flowchart which implements the use of pop-up dialog boxes to facilitate a user selecting print media and print side at print time in accordance with the preferred embodiment of the present invention.
Figure 6:
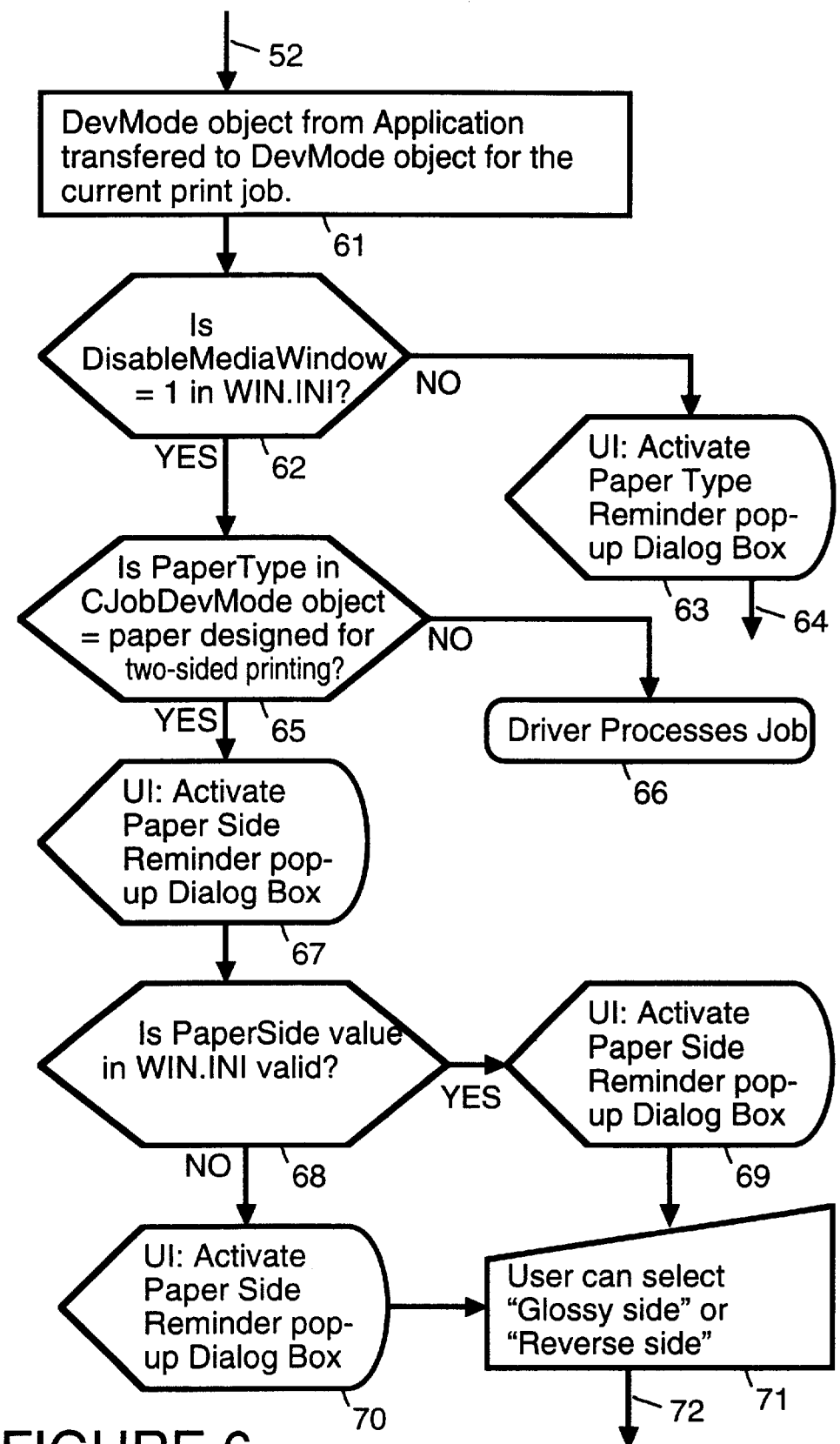
Figure 7:
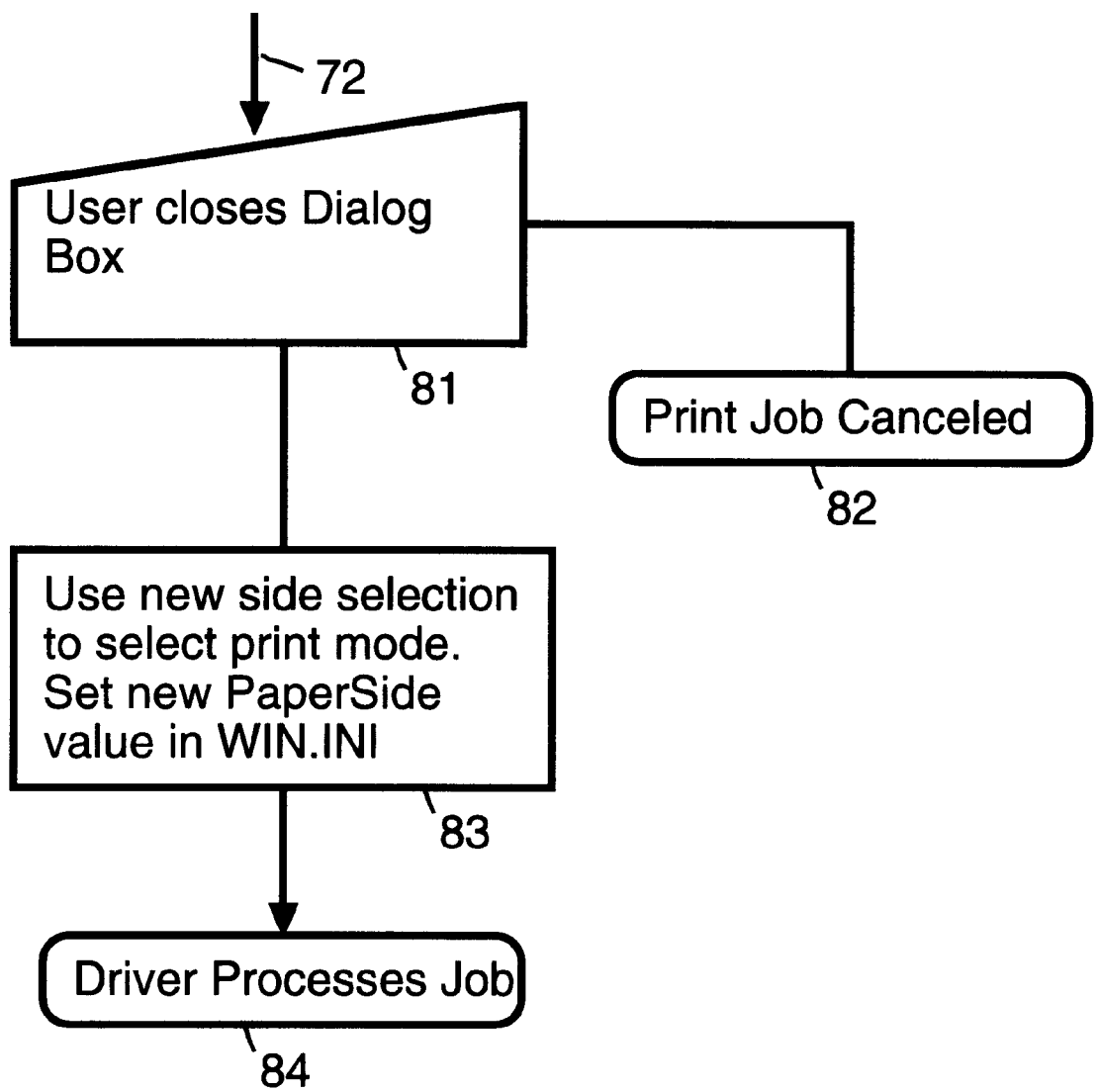

As shown in FIG. 4, special dialog box 30 includes a field 32 which allows a user to select a side of the paper on which to print. The default side which is selected when dialog box 30 first appears is the side which the user last selected when printing from the current application. An initial default side is glossy. Special dialog box 30 does not appear for media types which are not designed for two-sided printing. Further dialog box 30 only is used when dialog box 20 is disabled. Dialog box 30 cannot be disabled.

If the user does not interact with dialog box 30, dialog box 30 will automatically close in one minute and the print job will start, except, however, that dialog box 30 will not close while the Help window is open.

FIG. 5, FIG. 6, FIG. 7, FIG. 8 and FIG. 9 together form a flowchart which implements the use of pop-up dialog boxes to facilitate a user selecting print media and print side at print time.

In a step 41, the user selects to print a file. In a step 42, the user has the option of opening properties user interface 120 (shown in FIG. 10). If the user does open properties user interface 120 (shown in FIG. 10), in a step 43 computer system 11 checks the paper type stored as the variable PaperType value in the file WIN.INI. If the variable PaperType value in the file WIN.INI is equal to −1 or does not exist, in a step 44, string selection (i.e., the paper type that will be selected in paper type combination box 21 of dialog box 20) is set to the PaperType value in the DevMode object for application program 13. The print quality (PQ) is set to the value in the internal table for the selected PaperType.

If in step 43 the PaperType value in the file WIN.INI exists and has a value other than −1, in a step 45, string selection is set to the PaperType value in the file WIN.INI. Print quality is set to the value in the internal table for the selected PaperType value. In general, the "PaperType" value in WIN.INI is for print driver 14 and is not for specific applications. The "PaperType" value in WIN.INI is set to the initial value of −1 when printer driver 14 is installed. After installation, the "PaperType" value is set as discussed herein.

In a step 46 the user has the option of clicking "Apply" button 129 in properties user interface 120 (shown in FIG. 10). If the user clicks on "Apply" button 129, in a step 47, computing system 11 saves the value of the election in the paper type list box field saved in the DevMode object.

In a step 48, the user closes the dialog box for properties user interface 120 (shown in FIG. 10). If the user closes the dialog box via OK button 127, in a step 50 the current settings are saved in the DevMode object. The DevMode object is returned to application program 13 with the changes made. Also the PaperType value in the file WIN.INI is set to −1.

If in step 48, the user closes the dialog box for properties user interface 120 (shown in FIG. 10) via cancel button 128, in a step 49 the current settings are not saved in the DevMode object. The DevMode object is returned to application program 13 without the changes being made. Also the PaperType value in the file WIN.INI remains unchanged.

In a step 51 the user clicks OK button 113 on print dialog box 110. As shown by connector 52, this leads to a step 61 shown in FIG. 6.

In step 61, computing system 11 transfers the DevMode object from application program 13 to the DevMode for the current print job (i.e., CJobDevMode). In a step 62 computer 11 checks to see if dialog box 20 has been disabled. This would be indicated if the variable DisableMediaWindow stored in the file WIN.INI is equal to 1. If the variable DisableMediaWindow stored in the file WIN.INI is not equal to 1, in a step 63, the user interface activates dialog box 20. Connector 64 then goes to a step 91, shown in FIG. 8.

If in step 62 (shown in FIG. 6) the variable DisableMediaWindow stored in the file WIN.INI is equal to 1, in a step 65, computer system 11 checks to see if the PaperType in the DevMode for the current print job indicates selection of a paper type which has been designed for two-sided printing. If not, in a step 66 printer driver 14 processes the job for printing on printer 15.

If in step 65, computer system 11 detects the PaperType in the DevMode for the current print job is equal to a paper type which has is designed for two-sided printing, in a step 67, the user interface of computing system 11 activates pop-up dialog box 30.

In a step 68, computing system 11 determines whether the PaperSide value in the file WIN.INI is valid. If so, in a step 69 the user interface of computing system 11 displays dialog box 30 on monitor 16 with either "Glossy side" or "Reverse side" selected, depending on the PaperSide value in the file WIN.INI. Table 2 below sets out WIN.INI values, for printer driver 14:

TABLE 2

| Value name | Default | Possible Values |
| --- | --- | --- |
| DisableMediaWindow | 0 | 0,1 |
| PaperType | −1 | −1,257–264 |
| PaperSide | 0 | 0,1 |

The possible values 257–264 for PaperType are internal values for paper types.

If in step 68, computing system 11 determines the PaperSide value in the file WIN.INI is invalid, in a step 70 the user interface of computing system 11 displays dialog box 30 on monitor 16 with "Glossy side" selected.

In a step 71 the user can select either "Glossy side" or "Reverse side". Connector 72 shows flow then going to a step 81 in FIG. 7. In step 81 the users closes dialog box 30.

If the user closes dialog box 30 via cancel print job button 34, in a step 82 the print job is canceled. If in step 81 the user closes dialog box 30 via OK button 33, in a step 83 a new side selection is set in the DevMode for the current print job and thus used to select the print mode. The new selection is also stored as a new Paper Side value in the file WIN.INI. In a step 84, printer driver 14 processes the job for printing on printer 15.

Figure 8:
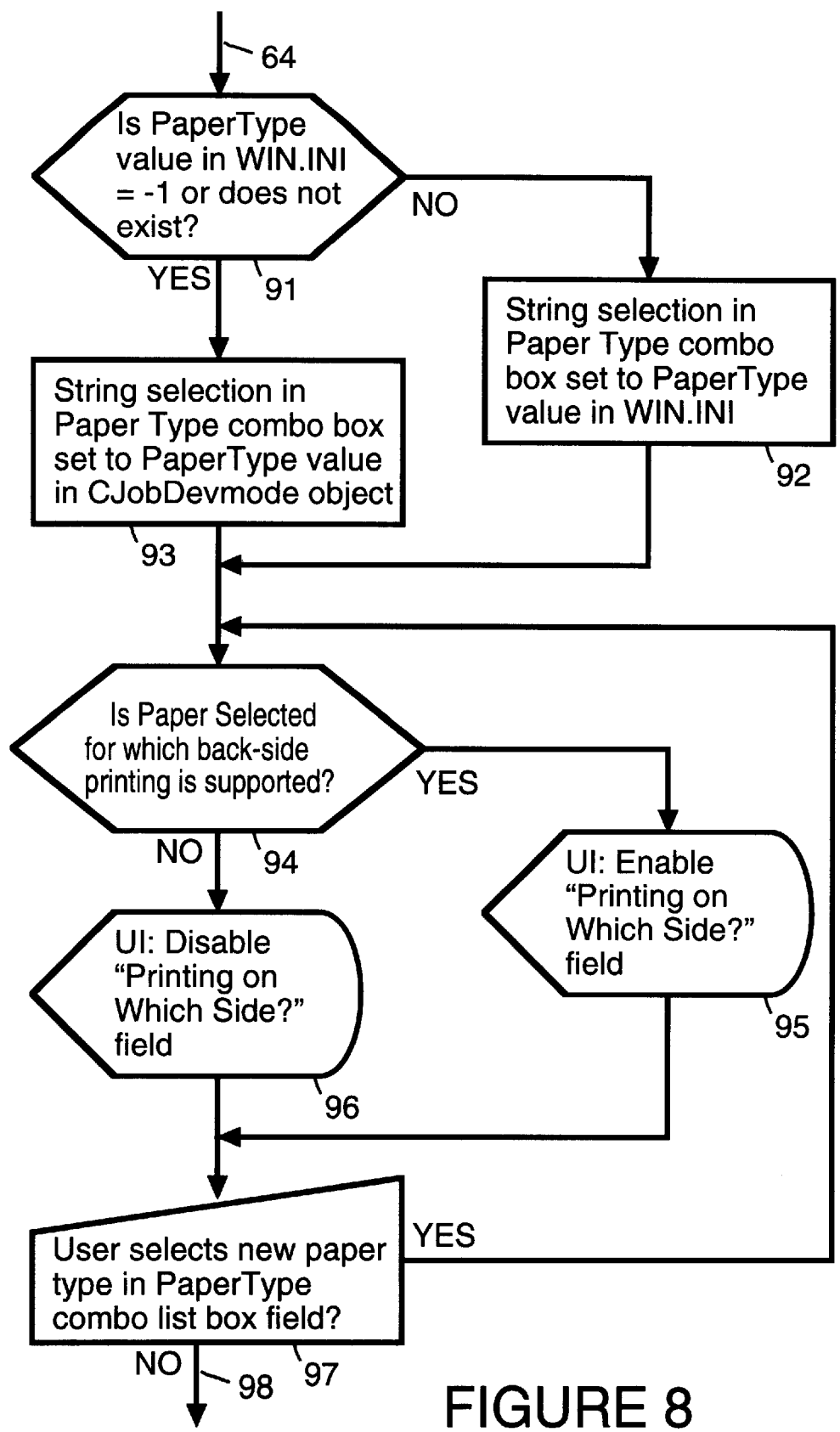
Figure 9:
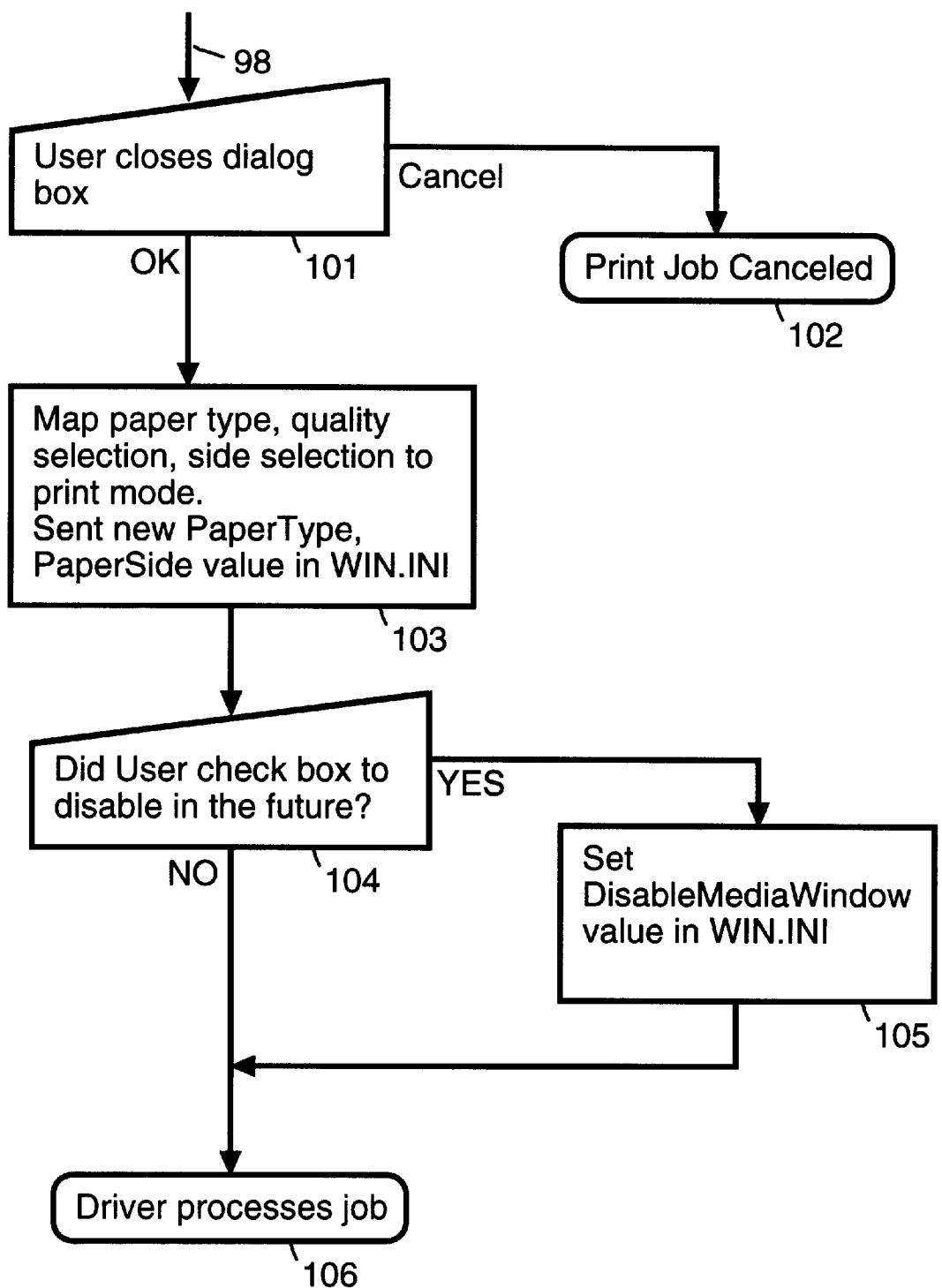

In step 91, shown in FIG. 8, computing system 11 determines whether a PaperType value in the file WIN.INI is equal to −1 or does not exist. If the variable PaperType value in the file WIN.INI is equal to −1 or does not exist, in a step 93, string selection in paper type combination box 21 is set to the PaperType value found in the DevMode for the current print job (i.e., CJobDevMode). If in step 91 the PaperType value in the file WIN.INI exists and has a value other than −1, in a step 92 string selection in paper type combination box 21 is set to the PaperType value in the file WIN.INI for application program 13.

In a step 94, computer system 11 checks to see if the PaperType value in the DevMode for the current print job is equal to a paper type designed for two-sided printing, which indicates selection of a paper type which has been designed for two-sided printing. If so, the user interface of computing system 11 in a step 95, enables field 22 of dialog box 20. If in step 94, computer system 11 determines that the PaperType value in the DevMode for the current print job is not equal to a paper type designed for two-sided printing, the user interface of computing system 11 in a step 95, disables field 22 of dialog box 20.

In a step 97 the user has the option of selecting a new paper type in paper type combination box 21. If the user does select a new paper type, the flow returns to step 94. If in step 97 the user does not select a new paper type, as illustrated by connector 98, in a step 101 the user closes dialog box 20.

If the user closes dialog box 20 via cancel print job button 24, in a step 102 the print job is canceled. If in step 101 the user closes dialog box 20 via OK button 33, in a step 103 a new side selection, new map paper type, and new print quality selection are mapped in the DevMode for the current print job and thus used to select the print mode. The new selection is also stored as a new Paper Type and new Paper Side values in the file WIN.INI.

In a step 104 the user has the option to select box 26 disabling dialog box 20 in the future. If the user has selected box 26, in a step 105, computing system 105 sets the DisableMediaWindow value in the file WIN.INI, which will disable dialog box 20. In a step 106, printer driver 14 processes the job for printing on printer 15.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for selecting printing features at print time comprising the steps of:
(a) upon a user selecting to perform a first print job from an application, displaying a print dialog box;
(b) upon the user closing the print dialog box without canceling the first print job, displaying a media-type pop-up dialog box which allows a user to specify which type of media is to be used for printing the first print job;
(c) upon the user changing selection of media-type, changing print parameters for the first print job; and
(d) upon the user closing the media-type pop-up dialog box without canceling the first print job, printing the first print job.

2. A method as in claim 1 additionally comprising the following step performed before step (d):
(e) upon the user making a first selection, not displaying the media-type pop-up dialog box for future print jobs.

3. A method as in claim 1 wherein in step (b) the media-type pop-up dialog box also allows a user to specify, for a first subset of media types, which side of the media will be used for printing the first print job.

4. A method as in claim 3 additionally comprising the following step performed before step (d):
(e) upon the user changing selection of side to be printed, changing print parameters for the first print job.

5. A method as in claim 3 wherein when in step (c) the user selects a media-type which is not among the first subset of media types, not allowing the user to specify which side of the media will be used for printing the first print job.

6. A method as in claim 3 additionally comprising the following step performed before step (d):
(e) upon the user making a first selection, not displaying the media-type pop-up dialog box for future print jobs.

7. A method as in claim 6 additionally comprising the following steps performed after step (d):
(f) upon the user selecting to perform a second print job from the application, displaying the print dialog box;
(g) upon the user closing the print dialog box without canceling the second print job, performing the following substep:
(g.1) if a media-type for the second print job is among the first subset of media types, displaying a paper side dialog box which allows a user to specify which side of the media will be used for printing the second print job; and,
(h) upon the user closing the paper side dialog box dialog box without canceling the second print job, printing the second print job.

8. A method as in claim 7 wherein step (g) additionally comprises the following substep performed after substep (g.1):
(g.2) upon the user changing selection of side to be printed, changing print parameters for the second print job.

9. A method as in claim 7 wherein step (g) additionally comprises the following substep:
(g.2) if the media-type for the second print job is not among the first subset of media types, not displaying the paper side dialog box before printing the second job.

10. Storage media that stores software, the software when run on a computing system performing a method comprising the following steps:
(a) upon a user selecting to perform a first print job from an application, displaying a print dialog box;
(b) upon the user closing the print dialog box without canceling the first print job, displaying a media-type pop-up dialog box which allows a user to specify which type of media is to be used for printing the first print job;

(c) upon the user changing selection of media-type, changing print parameters for the first print job; and (d) upon the user closing the media-type pop-up dialog box without canceling the first print job, printing the first print job.

11. Storage media as in claim 10 wherein the method additionally comprises the following step performed before step (d):

(e) upon the user making a first selection, not displaying the media-type pop-up dialog box for future print jobs.

12. Storage media as in claim 10 wherein in step (b) the media-type pop-up dialog box also allows a user to specify, for a first subset of media types, which side of the media will be used for printing the first print job.

13. Storage media as in claim 12 wherein the method additionally comprises the following step performed before step (d):

(e) upon the user changing selection of side to be printed, changing print parameters for the first print job.

14. Storage media as in claim 12 wherein when in step (c) the user selects a media-type which is not among the first subset of media types, not allowing the user to specify which side of the media will be used for printing the first print job.

15. Storage media as in claim 12 wherein the method additionally comprises the following step performed before step (d):

(e) upon the user making a first selection, not displaying the media-type pop-up dialog box for future print jobs.

16. Storage media as in claim 15 wherein the method additionally comprises the following steps performed after step (d):

(f) upon the user selecting to perform a second print job from the application, displaying the print dialog box;

(g) upon the user closing the print dialog box without canceling the second print job, performing the following substep:

(g.1) if a media-type for the second print job is among the first subset of media types, displaying a paper side dialog box which allows a user to specify which side of the media will be used for printing the second print job; and, (h) upon the user closing the paper side dialog box dialog box without canceling the second print job, printing the second print job.

17. Storage media as in claim 16 wherein step (g) additionally comprises the following substep performed after substep (g.1):

(g.2) upon the user changing selection of side to be printed, changing print parameters for the second print job.

18. Storage media as in claim 16 wherein step (g) additionally comprises the following substep:

(g.2) if the media-type for the second print job is not among the first subset of media types, not displaying the paper side dialog box before printing the second job.

* * * * *